Figure 1:
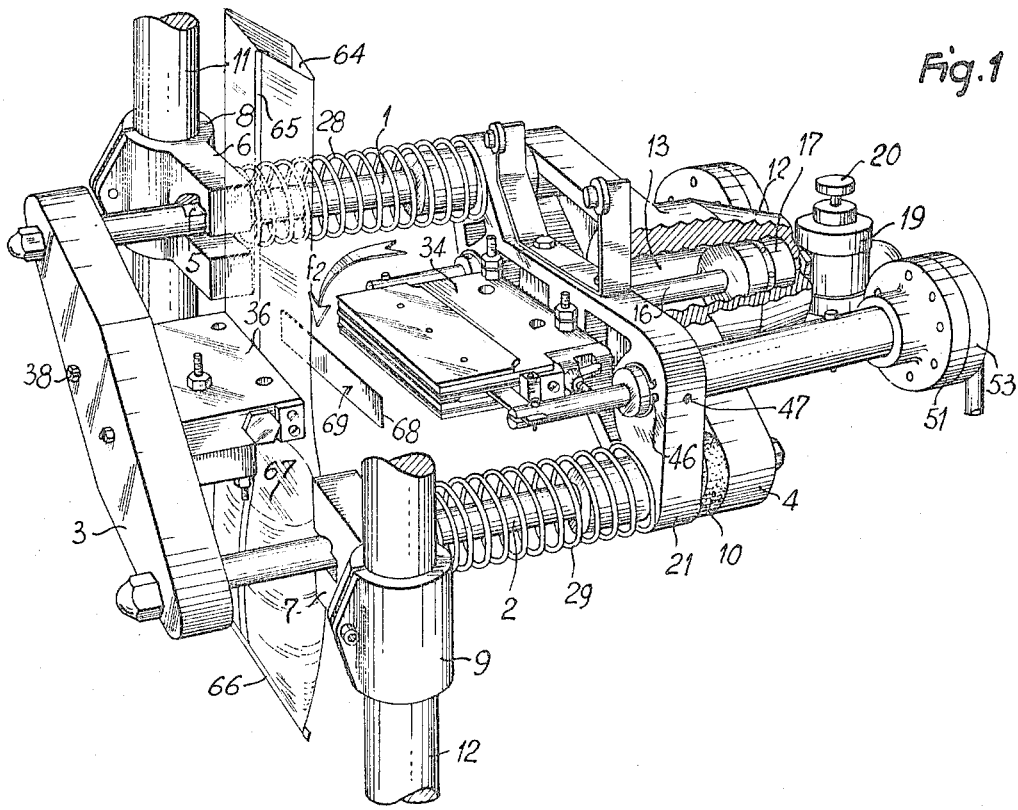

Dec. 6, 1966 C. A. AUBIN 3,289,388
APPARATUS FOR PACKING FLUENT SUBSTANCES
IN SEALED PLASTIC CONTAINERS
Filed May 29, 1963 4 Sheets-Sheet 2

INVENTOR
CLAUDE A. AUBIN
BY Wilkinson, Mawhinney & Theibault
ATTYS.

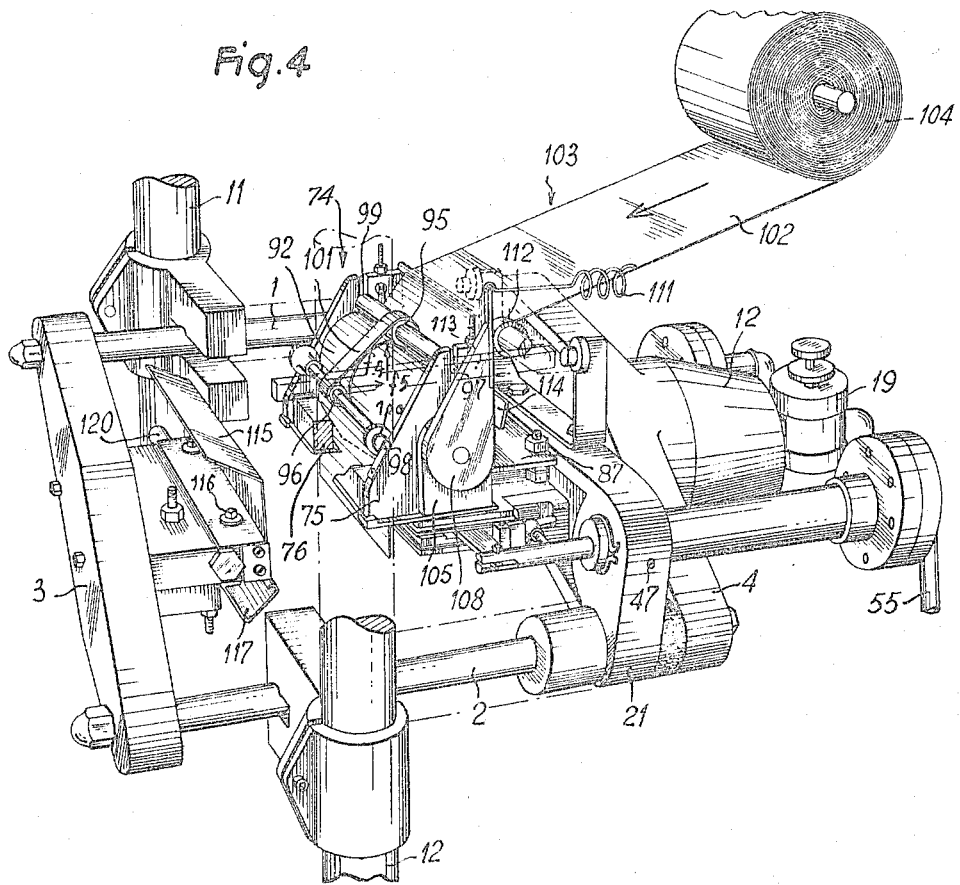

Dec. 6, 1966   C. A. AUBIN   3,289,388
APPARATUS FOR PACKING FLUENT SUBSTANCES
IN SEALED PLASTIC CONTAINERS
Filed May 29, 1963   4 Sheets-Sheet 4
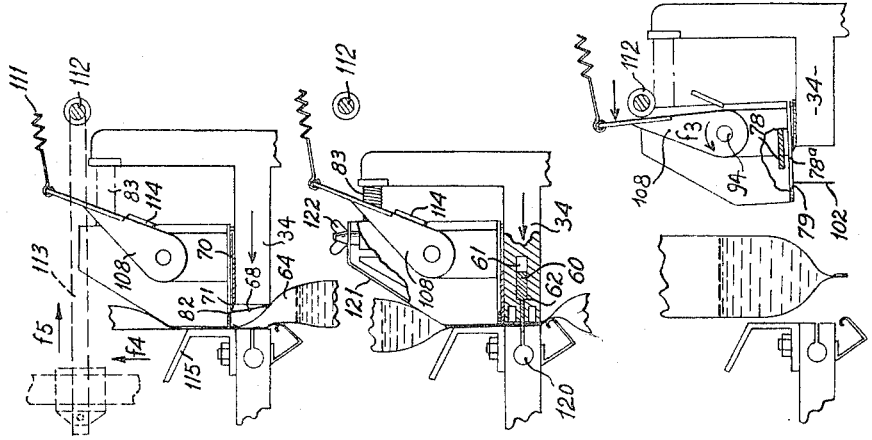
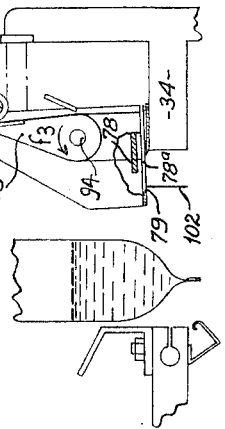
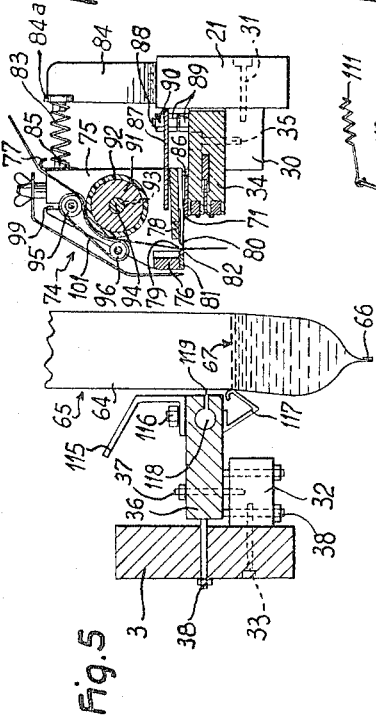
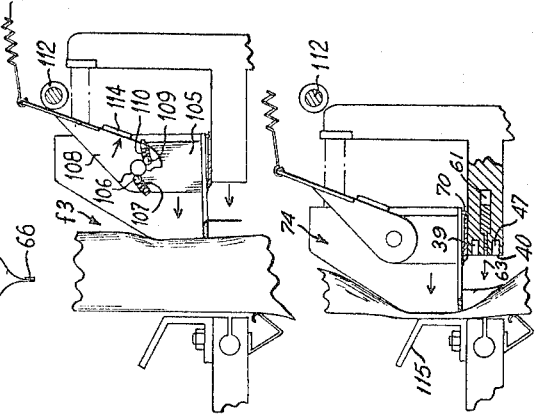
INVENTOR
CLAUDE A. AUBIN

United States Patent Office 3,289,388
Patented Dec. 6, 1966

3,289,388
APPARATUS FOR PACKING FLUENT SUBSTANCES IN SEALED PLASTIC CONTAINERS
Claude A. Aubin, Paris, France, assignor to Societe d'Etude & d'Application Industrielle de Brevets (S.E.A.B.), Villejuif, Seine, France, a corporation of France
Filed May 29, 1963, Ser. No. 284,203
Claims priority, application France, May 30, 1962, 899,254
14 Claims. (Cl. 53—180)

This invention relates to the packaging of fluent substances in individual sealed tubular containers of flexible thermoplastic sheet material. Substances amenable to this type of packing may include liquid, pastelike, pulverulent or granular materials, and the expression "fluent" as used in the specification and claims should be interpreted as being applicable to materials of any of these various kinds. Some examples of the field of applicability of the invention relate to the food industry, as for the packing of milk, mineral water and other beverages and food products.

Apparatus for producing packages of the above type should, broadly speaking, be capable of performing the above sequence of steps in a cyclic, preferably fully automatic manner and at a high rate:

Introduce a metered amount of the substance into a tubular container blank of plastic sheet material, sealed at its bottom end;

Provide a plastic heat bond across the tubular blank above the body of substance filled into it; and Cut across the tubular blank in the region of the bond or seal thus formed to provide a complete filled and sealed package, and then advance the tubular blank for a fresh cycle of operation.

Where the substance being packed is liquid, the strength requirements imposed on the end seals of the container are particularly severe. The liquid contents is both mobile and uncompressible, so that the slightest tear or crack in the container, which per se is soft and flexible, will result in the outflow of all of the contents, which not only represents a loss of merchandise but is liable to deteriorate other goods stored or shipped simultaneously with it. In view of these requirements, the containers are made from thermoplastic sheet of relatively great thickness and strength, and it is essential that the heat seals formed at the ends of the container shall not be any weaker than the walls of the container itself.

However, certain otherwise desirable thermoplastic sheet materials, including especially certain materials acceptable to food and drug authorities as not being liable to impair the characteristics of foodstuffs contained therein from the standpoint of health, are not especially well-suited to the formation of strong bonds. This is especially true of polyethylene sheet. A heat bond formed between portions of such thermoplastic sheet materials by the application of heat and pressure thereto, is not sufficiently strong to satisfy the requirements of liquid packages as stated above and it has been found in practice that the requisite bond strength can only be achieved if the bond is reinforced with a suitable material which should be both relatively strong and cheap enough not to increase sensibly the cost price of the resulting package cardboard and fabrics have been proposed as reinforcing materials for this purpose.

Accordingly, in certain conventional packing machines of the general type to which the invention relates means have been provided for coating one side of a tape or band of such reinforcing material with a thermoplastic coating of a nature generally similar to the material from which the container itself is made, and applying the coated surface of the tape over the region where a bond is to be formed across the container, then applying heat and pressure so as to fuse intimately the thermoplastic materials of the container walls and the reinforcement coating. It is found that by this means a seal of adequate strength for the purpose of packaging liquid substances can be obtained.

Heretofore, reinforced thermoplastic containers of this type were generally produced by discontinuous processes, in which the steps of forming the individual containers, filling, reinforcing and sealing them, were performed at separate stations with considerable manual intervention, so that such processes were far too costly and slow for most large-scale commercial needs.

The applicants are aware of a prior-art proposal for apparatus capable of performing the above steps involved in the production of reinforced thermoplastic packages continuously and automatically, but in that apparatus the reinforcement was provided in the form of a continuous band of reinforcing material (cardboard) extending the full length of the tubular container along one side of it and bonded to it at both ends. The resulting package not only is ungainly and unattractive, but represents the loss of a major amount of the reinforcing material used, which is retained in the finished package to no useful purpose. For example, for 2 centimeters useful length of reinforcing material, from 15 to 20 cm. were used up to provide the useless and objectionable length of superfluous material in the finished package. Removal of this superfluous material from the finished package would of course represent a further increase in the cost price. It should be realised in this connection that in the case of many low-priced food products to which the packaging means described are applied, e.g., milk, the cost of the expendable packaging means represents a major fraction of the total costs.

It is an object of this invention to provide improved packing apparatus of the type described, in which all the above mentioned difficulties are completely eliminated in that the apparatus will automatically cut off the requisite lengths of reinforcing material and apply them to the end areas of the container required to be sealed, thereby producing finished containers of high strength and superior aspect without any loss of reinforcing material and at lower cost. An object is to provide a relatively simple, practical and sturdy appliance for achieving the above result and which can conveniently be constructed as an attachment adaptable to existing apparatus for producing sealed thermoplastic packages. Other objects and advantages of the invention, and the novel features thereof, will appear as the disclosure proceeds.

Figure 2:
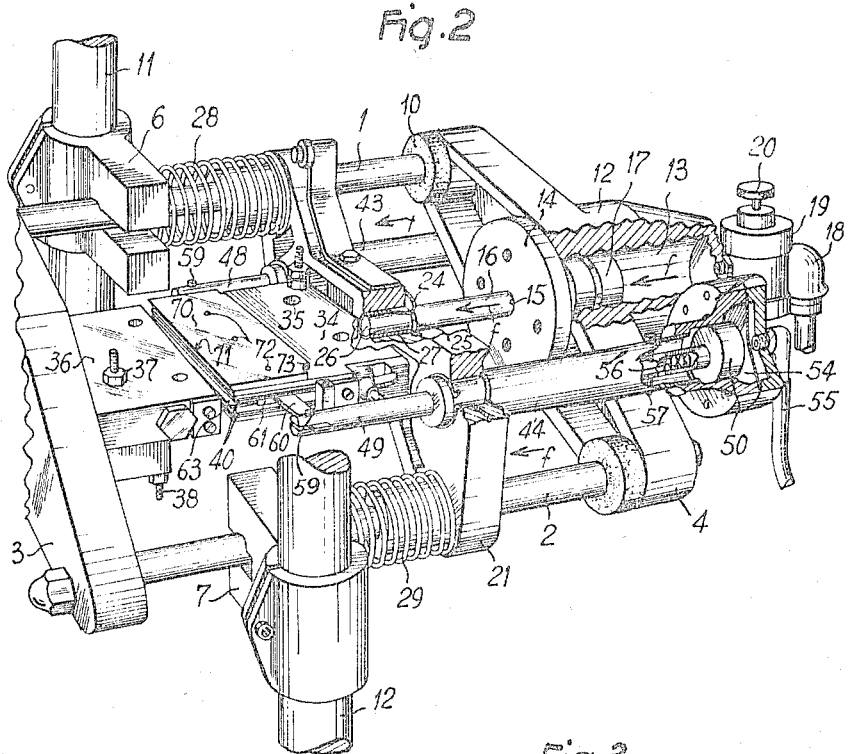
Figure 3:
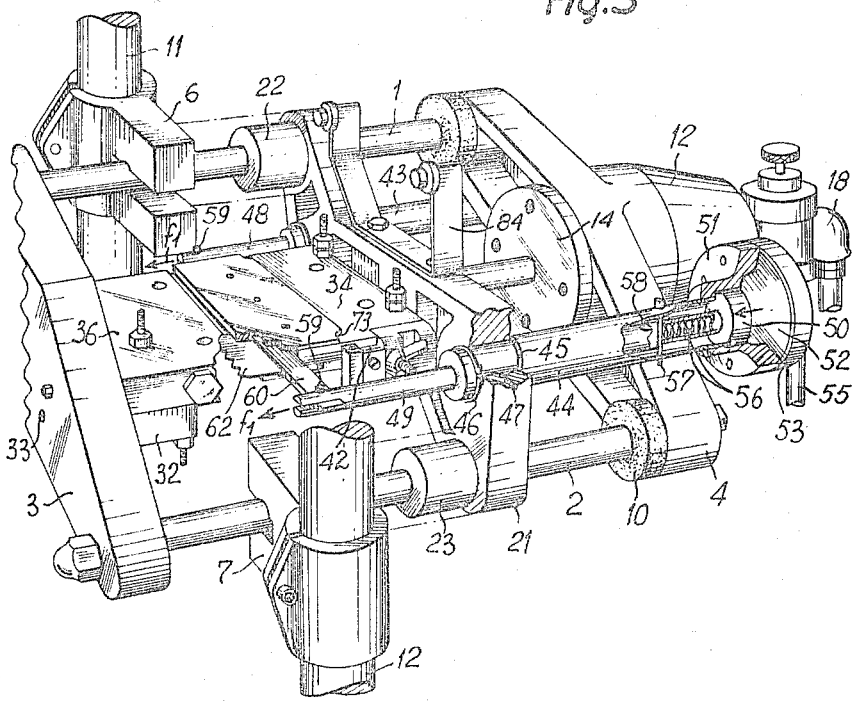

An exemplary embodiment of the invention will now be described for purposes of illustration but not of limitation with reference to the accompanying drawings wherein:

FIG. 1 is a perspective view, with parts broken away, of apparatus for cyclically producing sealed thermoplastic tubular containers filled with doses of a fluent substance, the attachment serving to cut and apply the reinforcing strips according to the invention being removed, and the apparatus being shown in the position assumed by the parts at the start of an operating cycle, FIG. 2 is a generally similar view with the parts being shown in the position assumed during the sealing stage of the cycle, FIG. 3 is again a similar view as seen in the stage at which the tubular blank is being cut off to provide a finished package, FIG. 4 is similar to FIG. 1 but shows the attachment for supplying and cutting the reinforcing strips according to the main aspect of the invention, mounted in place, FIG. 5 is a smaller-scale view, generally in vertical section, with parts shown in elevation and others broken away, showing the assembly of FIG. 4 at a point in the operating cycle at which a dose of substance has been filled into the container blank and the movable part of the assembly is about to advance towards the blank to perform the strip cutting, applying, and bonding functions and then the cutting step to separate the finished container, and, FIGS. 6 to 10 are schematic partial views corresponding to FIG. 5 and relating to further successive stages in the operating cycle of the apparatus.

The apparatus illustrated in the drawings comprises a main section which operates to produce a series of tubular containers by providing spaced transverse bonds across a continuous tubular blank and cutting the blank across the bond areas, and an attachment for feeding, cutting and applying the reinforcing strips to the bond areas as previously specified. The main section of the machine will first be described with reference to FIGS. 1, 2 and 3.

The tube bonding-and-cutting section of the machine comprises a frame which consists of a pair of parallel spaced side bars 1 and 2 and a pair of flanged cross members 3 and 4 firmly secured across the ends of the side bars as by means of the nuts shown, screwed over projecting threaded end portions of the bars extending through holes in the crossbars. The bars 1 and 2 are formed with flats such as 5 adapted to be clamped between the jaws 6 and 7 of a pair of clamp members including collar portions 8 and 9 which in turn are clamped, as by means of flanges and bolts, about spaced vertical columns 11 and 12 of a suitable press. For reasons connected with easy accessibility of the components slidable along the side bars 1 and 2 as later described, the clamp 8 is fixed at a level somewhat higher on its column than the clamp 9, so that the frame 1, 2, 3, 4 is somewhat slanted in a direction forwardly from the plane of the figure.

The crossmember 4 is provided in its central part with a projecting nose or housing portion 12 integrally cast with it, and defining internally a cylindrical chamber 13 sealed at its outer end. At its inner end chamber 13 is sealed with a disc member 14 (see FIGS. 2 to 4) secured to the inner side of the cross member 4 as with screws, and provided with a central bore 15 through which slidably extends the rod 16 of a piston 17 which in turn is slidable in the chamber 13. Connecting with the chamber 13 through the sealed outer end of the housing 12 is a compressed-air supply arrangement including an air delivery line 18 connected to the housing by way of a diaphragm type valve 19 provided with an adjusting knob 20 by means of which the rate of air delivery into the cylinder space 13 can be manually adjusted.

The pneumatic actuator thus described serves to reciprocate by way of the piston rod 16, a carriage 21 back and forth along the side bars 1 and 2. The carriage is in the form of a flanged plate provided with guiding bosses 22 and 23 (FIG. 2) perforated for sliding engagement with the side bars 1 and 2. As shown in the cut-away portion of FIG. 2, pressure is transmitted from piston rod 16 to the slider carriage 21 through a pressure-taking washer 24 engaged by surface 25 of the rod and secured to a centering pin 26 engaging a bore 27 formed centrally in plate 21. Normally plate 21 is urged towards the cross member 4 by the force of two compression springs 28 and 29 surrounding the bars 1 and 2 having their one ends abutted against surfaces of the clamps 6 and 7 and their other ends abutted against the carriage plate 21 around the guide bosses 22 and 23.

When pressure is admitted into the pneumatic actuator from pipe 18, the piston 17 is urged in the direction of arrows $f$ (leftward) in FIG. 2, and the piston rod 16 moves carriage 21 in the same direction, compressing the springs 28 and 29. When pressure is released from the actuator, the springs 28 and 29 retract the carriage 21 towards cross member 4. Pads 10 of suitable damping material (see FIG. 3) are provided around the ends of bars 1 and 2 adjacent member 4 for cushioning the return stroke of the carriage.

The mechanism for forming transverse bonds across the continuous tubular blank will now be described. This mechanism is generally located between the cross member 3 and the reciprocatory carriage 21. It will be understood that conventional means, not shown, are provided for feeding the tubular blank indicated at 64, stepwise in a downward direction through the frame 1, 2, 3, 4 as shown, e.g., in FIG. 5.

A stationary supporting shelf plate 32 is secured centrally to the inner side of cross member 3 with screws 33 and projects towards carriage 21, and a fixed clamp jaw or plate 36 of rectangular form is secured over shelf plate 32 with bolts 37. Similarly, a movable clamp jaw plate 34 is secured with screws 35 over the upper surface of a shelf plate 30 (not apparent in FIGS. 1–4 but visible in the schematic views of FIGS. 5–10) secured to the carriage 21 with screws 31 centrally thereof, and opposite to shelf 32. Means are provided, including the adjusting screws and locknuts 38, for adjusting the angular position of fixed clamp plate 36 so that its vertical outer end face is accurately parallel to the vertical outer end face of clamp plate 34, whereby the two clamp plates 34 and 36 will constitute a pair of clamping jaws capable of tightly gripping the work between them as later described. A pair of parallel spaced longitudinal grooves 39 are formed along the vertical side and end surfaces of the clamp plate 34 (FIG. 7) and a pair of heating resistors are received in the grooves, being in the form of thin strips 40 of suitable resistive material bedded in insulating filler material 41. Current can be supplied to the resistors by way of terminals 42 mounted on the sides of plate 34 (see FIGS. 3 and 4).

Before describing the operation of the bond-forming mechanism, the means for cutting off the lengths of the tubular blank to provide the individual containers will be described.

Secured to the sides of the reciprocatory carriage 21 are a pair of fluid actuator tubes 43 and 44 (see FIG. 3), having reduced end portions 45 engaged in corresponding bores of the carriage 21 and firmly blocked therein by means of retainer rings 46 and set screws 47. Piston rods 48 and 49 are slidable in and project from the actuator tubes towards the cross member 3. The remote ends of the tubes 43 and 44 connect with flared, enlarged cylinder casing members 51 fitted with cover members 53 to define sealed actuator cylinders, in which pistons 50 connected to the corresponding ends of rods 48 and 49 are movable. Extending across said sealed cylinders are flexible diaphragms 52 having their peripheries clamped between the casing and cover members 51 and 53, and engaging the outer sides of the pistons 50. Compressed air can be applied into the chambers 54 by way of pipes 55, whereupon the diaphragms 52 will be expanded leftward and urge the pistons 50 in the same direction, causing the piston rods 48 and 49 to be projected outwards towards cross member 3.

The rods 48, 49 are tubular, and receive compression springs 56 abutted at their one ends against cross pins 57 secured to the walls of cylinders 43 and 44, and at their opposite ends against the pistons 50. Longitudinal slots 58 formed in the walls of rods 48 and 49 enable the crosspins to extend freely therethrough without interfering with the sliding movements of the rods and pistons. Thus the action of springs 56 is to urge the piston 50 and their related rods 48 and 49 rightward in the drawings.

The free outer ends of piston rods 48 and 49 are pivoted through pins 59 to the respective ends of a transverse bar 60 of flat cross section. The bar 60 extends in its intermediate portion through a flat rectangular slot or channel 61 formed through the plate 34, from one side to the other thereof intermediate its top and bottom faces (see FIG. 2). The bar 62 carries in its front portion a fine toothed saw blade 62 which is received in a narrow horizontal slot 63 positioned forwardly of channel 61 and between the grooves 39 (see FIGS. 7 and 9). The blade 62 is so dimensioned that it will be forced out of its slot as the bar 60, which is narrower than the channel 61, is moved into the left hand end of the channel, as indicated by the arrow f1 in FIG. 3.

The mechanism so far described operates as follows.

Initially a tubular blank 64 of thermoplastic sheet material, previously formed with a longitudinal fused seam 65, is allowed to hang freely between the jaw plates 34 and 36 (see FIGS. 1 and 5). At its lower end the tubular blank is sealed with a transverse seam 66 and is filled with liquid (or other fluent substance) up to a prescribed lever 67. The clamp plates 34 and 36 in this initial condition are spaced apart sufficiently to clear the sides of the bulging pocket formed by the tubular blank filled with liquid in its lower part.

Means, later described, now present a reinforcing strip 68 (as indicated by arrows f2 in FIG. 1), one side 69 of which was previously coated wtih a film of thermoplastic material preferably similar to the one from which the tubular blank 64 is made.

Compressed air is admitted through line 18 into the actuator chamber 17, whereby the carriage 21 is displaced from the position shown in FIG. 1 to that shown in FIG. 2. In this position the jaw plate 34 coacts with plate 36 to clamp the strip 68 tightly against the tubular blank 64 between the two plates.

Heating current is now applied to the resistors 40, whereby the thermoplastic material of the tubular blank and the reinforcing strip, in the area between the clamping jaws 34 and 36, fuses to provide a firm bond between the opposite walls of the tubular blank 64 and with the strip 68.

Compressed air is applied through the inlets 55 to the actuator chambers 54, shifting the diaphragms 52 and pistons 50 leftward. This displaces the cross-bar 60 and blade 62 carried by it leftward across the tubular blank and cuts through it and through the reinforcing strip at a vertical elevation substantially central through the sealing bond and previously formed and through the reinforcing strip.

The air pressure is now released from both the pressure lines 18 and 55. The carriage 21 and the actuator rods 48 and 49 are restored to the positions shown in FIG. 1 by the action of their respective springs. The clamping jaw 34 moves away from fixed jaw 36, releasing a finished tubular package which is allowed to drop into suitable receiving means provided underneath. The tube feeding means (not shown) are actuated to feed the tubular blank 64 downward by an amount corresponding to the length of a tubular container, and a fresh reinforcing strip 68 is presented, and the cycle is repeated.

The means for cutting and feeding the reinforcing strips 68 to the bonding position shown in FIG. 1 will now be described in greater detail. Said means are provided as an attachment shown in general perspective view in FIG. 4, and the operation thereof will be more clearly understood with reference to FIGS. 5-10.

Secured to the upper surface of jaw plate 34 is a flat steel blade having a cutting edge 71 at its outer end flush with its upper surface, in substantial vertical alignment with the adjacent vertical outer surface of the plate 34 (see FIG. 8). Blade 70 is secured to plate 34 as with three small screws 72 (see FIG. 2). The rear or inner edge of the blade is formed with two side notches 73.

Resting on the upper surface of blade 70 for rocking movement about its sharp edge 71 as a fulcrum, is a frame 74, somewhat shaped as a desk, i.e., having a sloping upper surface at its front or outer side. The frame 74 comprises a pair of spared vertical side flanges 75 interconnected by two cross members, a front cross member 76 and a rear one 77, and a bottom member 78 formed with a transverse slot 79 extending from one side flange to the other (see FIG. 5). The width dimension of frame 74 is substantially greater than that of the tubular blank 64. Under the bottom member of the frame 74 is secured a baseplate 80 of treated steel, generally U-shaped in plan contour, and extending substantially below the front cross member 76 and the side flanges 75, with the cross-piece 81 of the U-shaped plate being positioned at the left-hand side of the plate as shown in the drawings. The cross-piece 81 is formed with a cutting edge 82 at its inner or right-hand side, and flush with the under surface of said plate, so as to cooperate with the cutting edge 71 of blade 70 in providing a shear cutter device.

The frame 74 with its baseplate 80 is rockable about the line of the cutting edge 71 as earlier indicated and is urged in the counterclockwise direction, as shown, by a pair of compression springs 83 acting on the rear or right side of said frame near its top, said springs being seated at one end around centering pins 85 secured to the ends of the cross member 77, and at their other end around similar pins projecting from a pair of elements 84 secured to the rear of plate 21 at both sides thereof with screws 84a. The counterclockwise rotation of frame 74 is constrained by means of pins 86 extending from the under side of baseplate 80 and cooperating with the side walls of the aforementioned notches 73 in blade 70. The counterclockwise rotation of frame 74 is limited to an arc of small amplitude by abutment of the bottom plate 78 of frame 74 against the under surface of a horizontal plate 87 secured to the plate 34 at an adjustable elevation thereover by means of threaded studs 88, nuts 89, and locknuts 90. The side edges of plate 87 cooperate slidably with the inner surfaces of the flanges 75 to contribute to the axial guiding of the frame 74 during its shifting displacements relative to blade 70.

Mounted for rotation about a horizontal transverse axis within the frame 74 between the flanges 75 thereof, is a feeder drum 91 having a peripheral surface lining 92 of rubber or the like. The drum is secured by means of a set screw 93 on a shaft 94 journalled in suitable bearings in the flanges 75 and projecting at one end beyond the related flange (see FIGS. 4 and 5). Two presser rollers 95 and 96 are rotatably mounted on pivot rods 97 and 98 adjustably received in notches 99 and 100 of the flanges 75, so as to be positioned adjacent the surface of drum 91, and an endless belt 101 of rubber or the like is trained about said rollers.

A continuous tape 102 of cardboard or other reinforcing material to be used as the reinforcement for the transverse seals of the tubular blank, is stored as a roll on a pulley 104 (see FIG. 4) mounted on suitable means not shown above and rearward of the machine being described. The tape 102 is equal to or somewhat greater in width than the tubular blank 64, and its upper surface 103 is coated, by means not shown, with a film of thermoplastic material preferably similar or identical in nature to that of the material from which the tubular blank is made. Thus, if the blank is made from polyethylene sheet, the reinforcing tape 102 may be coated with polyethylene, or with another suitable thermoplastic material fusible with polyethylene. The tape 102 from roll 104 is passed in engagement with the curved upper edge surface of the rear cross member 77 of frame 74, then around part of the periphery of drum 91 against which it is applied in tight engagement by the endless belt 101, and the free end of tape 102 hangs substantially vertically down through the slot 79 and opposite to the outer or front face of plate 34 (see FIG. 10).

Means are provided for imparting to the drum shaft 94 a one-way step-by-step rotation in relation to frame 74 in the direction indicated by arrow f3, i.e., counterclockwise as shown (see FIG. 6). For this purpose the section of shaft 94 projecting beyond one of the side flanges 75 is provided with a one-way clutch device including a flange 105 cooperating with a ball 106 pressed by a spring 107 at an angle such as to cause ball 106 to jam on occurrence of a torque tending to rotate shaft 94 in the direction reverse from that indicated at f3. Further, the shaft 94 carries an actuating arm 108 rotatable with respect thereto, and a further one-way or over-running clutch device is provided between arm 108 and shaft 94 including a ball 109 pressed by a spring 110. The arrangement is such that when arm 108 is rocked back and forth with respect to frame 74 by means presently described, the shaft 94 and drum 91–92 is rotated step by step in the direction f3, to feed the reinforcing tape 102 leftward and downward as described.

To provide for the rocking reciprocation of arm 108 during reciprocation of slider 21 and frame 74 with respect to the fixed frame structure of the apparatus, the free end of said arm is connected by an elastic tension spring connection schematically indicated at 111 with a fixed point of the machine, such for instance as the pivot shaft of roll 104, or other stationary structure, so as to tend to rock arm 108 clockwise around its pivot axis with respect to frame 74. Further, a fixed camming member 112 is positioned in the path of movement of the arm 108 so as to rock it counterclockwise relative to frame 74 in opposition to the tension spring connection 111 on rightward displacement of slider 21 and frame 74. Cam 112 is suitably supported, e.g., from press standard 12 to be adjustable both vertically as indicated at "f4" and horizontally by displacement of the cam rod 113 as indicated by the arrow f5 (see FIGS. 4 and 8). Clockwise (or rearward) rotation of arm 108 relative to frame 74 is limited by a stop plate 114 projecting from flange 75 of frame 74.

Upstanding from the upper surface of clamping plate 36 near its outer end is a frame member 115 secured to plate 36 with screws 116 and having a contour generally symmetrical to that of the front side of frame 74. Moreover, to the under side of plate 36 is secured a frame member 117 of V contour (see FIGS. 4 and 5). The functions of their members will appear later. The vertical outer side of plate 36 is formed with a slot 119 positioned to receive the cutter blade 62 therein when the latter is projected during the tube-cutting stroke. The slot 119 connects with a cylindrical chamber 118 formed within the plate, which chamber further connects at one end with a line 120 connectable with a source of suction for reasons that will later be explained.

The mechanism operates as follows.

The operating cycle can be considered as commencing with the position shown in FIG. 1 and in FIG. 5 (and in FIG. 10), with carriage 21 and frame 74 positioned at maximum spacing rightward from the stationary clamp plate member 36 and tubular container blank 64.

As the carriage 21 moves leftward in the manner earlier described, from the position of FIG. 5 to that shown in FIG. 6 wherein the front surface of frame 74 engages the related side of tube 64, the actuating arm 108 is held in engagement with the cam 112 due to the tension of the spring connection 111 so that said arm is rotated clockwise with respect to the leftward-moving frame 74. Spring-pressed ball 109 permits such relative rotation of arm 108 with respect to shaft 94, while spring-pressed ball 106 jams and prevents shaft 94 from participating in the clockwise rotation of the arm. Drum 91 has thus been shifted bodily leftward without rotation, and in this movement has carried forward the tape 102 gripped against its periphery by rollers 95 and 96, roll 104 rotating sufficiently to permit such advance.

As the carriage 21 advances further leftward, the arm 108 engages the stop plate 114 and its clockwise relative rotation is arrested (FIG. 7). The front or outer vertical side of frame 74 gradually compresses the tubular container as shown, until its advance is arrested by abutment against the end of member 115 (FIG. 8). So far there has been no relative displacement between clamp jaw 34 and frame 74, nor rotation of drum 91 with respect to the frame, all the parts supported from carriage 21 having been shifted bodily together. Due to the pressure of frame 74 against the right side of tube 64, and the engagement of the left side of the tube by the V-shaped member 117, the portion of the tube 64 below the lower end of frame 74 is caused to bulge rightward due to the internal pressure of its liquid contents.

Carriage 21 advancing still further leftward, frame 74 is prevented from following the leftward displacement due to the action of stop member 115, so that the clamp plate 34 and blade 70 carried thereon slide leftward with respect to the baseplate 80 of frame 74, while springs 83 contract. The cutting edge 71 of blade 70 approaches towards coincidence with the cutting edge 82 of the stationary cutter blade 81, and the shears provided but the pair of blades is ready to operate for cutting off a strip 68 across the cardboard tape 102. On a further increment of leftward motion of the carriage 21 carrying jaw 34 and blade 70 somewhat further leftward with respect to baseplate 80, the strip 68 is cut off. It will be noted that on thus being cut off the strip 68 is received within the angle formed by the front face of jaw plate 34, and the outward bulging wall of the tubular container 64. Under continued leftward motion of the carriage the front face of jaw 34 applies the cut-off strip 68 against the wall of tube 64 as in FIG. 9.

The over-all position at this stage is that shown in FIG. 2, and the bonding and tube-cutting steps now proceed as earlier described, on completion of which the carriage 21 at the end of its leftward stroke is ready to reverse its motion. During this reverse (rightward) displacement of carriage 21, the relative movements occurring between frame 74 and plate 34 are similar to but reverse from those that took place during the forward stroke as above described.

During the initial stage of the reverse movement of carriage 21, suction from a suitable vacuum source is preferably applied to chamber 118 in order to draw off, through slot 119, any residual liquid filling the container that may have been entrapped within the tube between the seals. This optional feature is desirable in cases where the liquid, such as milk or other organic liquid, might contaminate parts of the mechanism and especially the heating resistors over which it would be liable to form an objectionable tarry deposit at the sealing temperatures used.

When the carriage 21 and frame 74 have receded sufficiently rightward, the arm 108 still abutted against stop plate 114 reengages the cam 112 as in FIG. 6. The arm is now rocked counterclockwise (arrow f3) relative to frame 74 as the latter continues to recede towards the right, so that ball 109 now jams while ball 106 slips, and drum 91 is now rotated with arm 108 counterclockwise as per arrow f3. Hence, when the carriage 21 has reached its rightmost end position (as shown in FIG. 10), the drum 91 has performed one step of counterclockwise rotation, advancing the tape 102 correspondingly, and feeding it through the slot 79 which at this time is open. The length of feed of the tape 102 per step can easily be controlled through adjustment of the cam 112, vertically and/or horizontally. A scraper element 78a is preferably secured under the bottom wall 78 to ensure that the lower end of the tape 102 from which the strip 68 has just been cut off, does not cling to the cutting edge 71 of the blade 70.

It will be seen from the foregoing that in the machine of the invention, the reinforcing strip 68 is presented to the movable sealing jaw at a certain point during the return (rightward) stroke of said jaw, whereas the strip is cut off during the forward stroke. This arrangement is advantageous chiefly in that it reduces to a minimum the distance over which the strip 68 has to be conveyed after being cut off from the tape 102. That is, the strip 68 is cut off during the latter part of the cycle, and is still integral with the tape during the first part of the cycle while being moved towards the tube 64. Moreover, since cutting edge 71 is positioned forwardly of plate 34 and the sliding plate 81 cooperating therewith only begins to act after engagement with the stop 115, the distance the separated strip 68 has to be transported after cut-off is further reduced to no more than the width of blade 81. Further, since the cutting edge 71 is positioned above the front face of jaw 34, the strip 68 is in effect blocked by the tube 64 itself, eliminating the requirement for any separate support to hold it in position during the short travel of the strip after cut-off.

The above features, preferably though not necessarily used jointly in the machine of the invention, all contribute to minimize the risk of the extremely lightweight strip 68 being displaced from its correct position between the time it is cut off from the tape and the time it is pressed and bonded to the tubular container. It is to be understood however that if desired, conventional suction means may be provided to assist in the correct retention of the strip in position during its transport, especially if one or more of the abovementioned advantageous features are omitted.

Use of the movable clamp jaw or plate 34 to support one of the blades of the shear cutting device, as described above, is advantageous in that it improves the compactness of the resulting mechanism.

It is preferred in the machine described that the width of the tape 102 shall correspond to the larger dimension of the reinforcing strip 68, since this results in a more compact roll 104 and simplifies the mechanism for transporting the strip 68. Nevertheless, a machine according to the invention may be constructed if desired so that the tape 102 has a width corresponding to the smaller strip dimension with the tape feed and strip cut-off means being appropriately disposed and positioned.

Advantageously, the cross member 76 of frame 74 and the blade 81 are contoured to the angular shape shown in FIG. 4, so that the strip 68 is cut off first at both sides and only later in its central part. This improves the angular relationship between the shear blades and improves the effectiveness of the shearing operation, while at the same time delaying by an additional small amount the instant at which the strip 68 is completely released.

The pivotal mounting of frame 74 about the cutting edge 71 is especially advantageous in providing a clearance take-up and wear compensating action whereby the cutter blades will at all times remain in full contact engagement with one another throughout the cutting operation.

Positioning the tape feed drum 91 in the frame 74 as described, rather than supporting said drum directly from the clamp jaw 34 is advantageous in that it makes it possible to present the tape 102 perpendicularly to the cutter blades to be more efficiently cut off thereby, while at the same time this arrangement makes it possible to retract the tape feeding means after the cut-off step, as described, thereby to provide ample clearance above the bonding station and thus greatly facilitate the filling of a fresh metered portion of material into the tubular container above the newly formed seal and in fact during the formation of said seal. For this purpose the frame 74 is preferably provided with a sheet metal tray 121 projecting from the front part of said frame and secured to it as with winged nuts 122 (see FIG. 9).

If desired however, the tape feed drum 91 may be supported from the plate 34 thereby foregoing the last advantage just discussed while still utilizing the forward and return strokes of said clamp plate 34 to effect the strip-advancing and tape feeding operations respectively in the manner earlier described.

While it is found convenient to connect the line 120 to a source of suction at the end of the cycle as described, this step may be omitted; or the line may be connected to a source of compressed air rather than vacuum, since this may equally be effective in discharging any remnants of liquid from the region of the bond where they would be liable to soil the heating resistors and other parts.

It will thus be seen that a wide range of modifications of the invention departing in many ways from the specific embodiment illustrated and described herein by way of example, are conceivable without departing from the scope of the invention. Many further variations may be conceived by those familiar with the art within the scope of the invention claimed.

What I claim is:

1. Apparatus for producing individual sealed plastic containers filled with doses of a fluid substance, which comprises means for feeding stepwise a continuous tubular blank of thermoplastic sheet material lengthwise of the blank, means for feeding stepwise towards said blank a continuous tape of reinforcing material having a thermoplastic surface and corresponding in width to the width of the tubular container each step of said tape feed corresponding in length to the minor dimension of said strip, means for cutting said tape along a direction transverse to the length dimension of the tubular blank near the free end thereof to produce a separate reinforcing strip, means for feeding the separate strip towards a side of the blank; bonding means including a pair of clamping members at least one of which is movable towards and away from the other and reciprocable for periodically clamping opposite wall portions of the tubular blank against each other and said thermoplastic surface of the separate strip against the outer surface of a wall portion of the blank transversely thereto in a narrow bonding area, and means for applying heat to said bonding area to form a thermoplastic bond between said wall portions of the blank and said strip surface; means for introducing a dose of substance into the tubular blank above the bond thus formed; and means for transversely cutting through said tubular blank and strip in the bond area to provide a filled and sealed container.

2. Apparatus according to claim 1, wherein the tape cutting means comprise a pair of cooperating tape cutting shear blades supported from the movable clamping member for relative displacement with respect to each other to cut the strip off the tape during one of the reciprocatory strokes of said clamping member.

3. Apparatus according to claim 2, wherein one of the tape cutting blades is secured to the movable clamping member.

4. Apparatus according to claim 3, including means for causing relative displacement between the tape cutter blades during movement of the reciprocatory clamping member towards the blank.

5. Apparatus according to claim 4, including an attachment frame supported on the reciprocatory clamping member for limited relative displacement with respect thereto in the direction of reciprocation of said member, the other of said tape cutting blades is secured to said attachment frame, and means are provided to displace the attachment frame relative to the member during movement of the member towards the blank.

6. Apparatus according to claim 5, including spring means for biasing the attachment frame away from the blank, and wherein the means for displacing the attachment frame comprise stationary abutment means disposed to arrest the movement of the attachment frame towards the blank prior to the termination of the movement of said member towards the blank.

7. Apparatus according to claim 5, including means mounting the attachment frame for limited rocking movement relative to said member about a fulcrum line substantially coincident with the cutting edge of said one tape cutting blade.

8. Apparatus according to claim 4, wherein said tape feeding means comprises a feeder member reciprocable with said clamping member, and means for actuating the feeder member during movement thereof away from the blank to advance an increment of tape.

9. Apparatus according to claim 8, wherein the feeder member is actuated in stepwise rotation to advance said increments of tape, and said feeder actuating means comprises an arm arranged for reciprocatory rotation during reciprocation of said member, and one-way clutch means connecting the arm and feeder member to convert the reciprocatory rotation of the arm into one-way stepwise rotation of the feeder member.

10. Apparatus according to claim 4, including an attachment frame supported on the reciprocatory clamping member for limited relative displacement with respect thereto in the direction of reciprocation of said member, the other of said tape cutting blades is secured to said attachment frame, said tape feeding means comprises a feeder member supported on said attachment frame, means are provided to displace the attachment frame relative to the clamping member during movement thereof towards the blank, and means for actuating the feeder member during movement of the attachment frame away from the blank to advance an increment of said tape past the tape cutting means toward the blank.

11. Apparatus according to claim 10 wherein said feeder member is a rotatable drum and presser means are provided for applying said tape over a portion of the drum periphery.

12. Apparatus according to claim 1, wherein said tape feeding means comprises a feeder member reciprocable with said clamping member and means for actuating the feeder at each reciprocation thereof to advance an increment of said tape past the tape cutting means and towards the blank.

13. Apparatus according to claim 1, including pneumatic means adjacent said blank cutting means and operable to generate a pneumatic force for expelling any residual amount of said substance from the area of the cut.

14. Apparatus for producing individual sealed plastic containers filled with doses of a fluent substance, comprising an open frame; means for feeding stepwise a continuous tubular blank of thermoplastic sheet material downward through the frame; a stationary clamping surface on the frame positioned to one side of the blank; a carriage reciprocable on the frame on the other side from said blank; a movable clamping member supported on the carriage and cooperating with the stationary clamping surface to clamp a portion of the blank thereagainst; a cutter blade movably supported on the clamping member and projectable outwardly therefrom towards the blank; heating means supported on the outer end surface of the clamping member above and below the cutter blade; an attachment frame supported from the carriage for limited reciprocatory movement with respect thereto and to the clamping member towards and away from the blank; tape feeding means on said attachment frame and means for guiding a continuous reinforcing tape having a thermoplastic surface from a store thereof past said tape feeding means in engagement therewith and therefrom towards said blank; cooperating tape cutter blades one secured to said carriage and another secured to said attachment frame and disposed on opposite sides of the path of said tape from said tape feeder means towards said blank; and actuating means cyclically operable in timed relation to the feed of the blank for reciprocating said carriage away from and towards the blank, and including means for actuating the tape feeding means during carriage movement away from the blank to feed a predetermined short amount of tape past the tape cutting blades towards the blank, means for displacing the attachment frame relative to the carriage during carriage movement towards the blank whereby to cause relative movement between the tape cutter blades to cut off a reinforcing strip adjacent a free end of the tape and advance the cut-off strip in engagement with the clamping member and into pressure-engagement with said blank, means for energizing the heating means to form a thermoplastic bond between opposite sides of the blank and said strip surface, means for introducing a dose of said substance into the blank above said bond, and means for projecting said first cutter blade to cut off the blank and strip across the bond area.

References Cited by the Examiner
UNITED STATES PATENTS

| 2,259,866 | 10/1941 | Stokes | 53—137 X |
| 2,294,220 | 8/1942 | Albertson | 53—128 X |

GRANVILLE Y. CUSTER, Jr., *Primary Examiner.*

FRANK E. BAILEY, *Examiner.*

S. A. BEND, *Assistant Examiner.*